United States Patent
Sirola

(10) Patent No.: US 7,301,498 B2
(45) Date of Patent: Nov. 27, 2007

(54) INSERTING MEASUREMENTS IN A SIMPLIFIED GEOMETRIC MODEL TO DETERMINE POSITION OF A DEVICE

(75) Inventor: Niilo Sirola, Tampere (FI)

(73) Assignee: Nokia Corporation, Espoo (FI)

( * ) Notice: Subject to any disclaimer, the term of this patent is extended or adjusted under 35 U.S.C. 154(b) by 294 days.

(21) Appl. No.: 10/938,418

(22) Filed: Sep. 10, 2004

(65) Prior Publication Data
US 2005/0080557 A1 Apr. 14, 2005

(30) Foreign Application Priority Data
Sep. 10, 2003 (FI) .................................. 20035151

(51) Int. Cl.
*H04B 7/185* (2006.01)

(52) U.S. Cl. .................................. 342/464; 342/357.14

(58) Field of Classification Search ........ 701/213–214, 701/207, 116; 455/456–456.1, 456.5–456.6; 342/352, 356, 357.01–357.1, 450–451, 357.14

See application file for complete search history.

(56) References Cited

U.S. PATENT DOCUMENTS

| | | | | |
|---|---|---|---|---|
| 4,987,420 A | * | 1/1991 | Inamiya | 342/457 |
| 5,890,068 A | * | 3/1999 | Fattouche et al. | 455/456.2 |
| 5,920,284 A | * | 7/1999 | Victor | 342/357.01 |
| 5,936,572 A | * | 8/1999 | Loomis et al. | 342/357.07 |
| 5,969,669 A | * | 10/1999 | Ishikawa et al. | 342/357.02 |
| 5,982,324 A | * | 11/1999 | Watters et al. | 342/357.06 |
| 5,986,603 A | * | 11/1999 | Schipper | 342/357.09 |
| 6,081,229 A | * | 6/2000 | Soliman et al. | 342/357.05 |
| 6,181,253 B1 | * | 1/2001 | Eschenbach et al. | 340/825.37 |
| 6,208,297 B1 | * | 3/2001 | Fattouche et al. | 342/450 |
| 6,236,359 B1 | * | 5/2001 | Watters et al. | 342/357.1 |
| 6,246,361 B1 | * | 6/2001 | Weill et al. | 342/357.01 |
| 6,252,543 B1 | * | 6/2001 | Camp | 342/357.06 |
| 6,289,280 B1 | * | 9/2001 | Fernandez-Corbaton et al. | 701/214 |
| 6,420,999 B1 | * | 7/2002 | Vayanos | 342/357.03 |
| 6,429,812 B1 | * | 8/2002 | Hoffberg | 342/357.1 |
| 6,429,815 B1 | * | 8/2002 | Soliman | 342/357.15 |
| 6,430,416 B1 | * | 8/2002 | Loomis | 455/456.1 |
| 6,515,617 B1 | * | 2/2003 | Demers et al. | 342/357.01 |
| 6,583,755 B2 | * | 6/2003 | Martinerie et al. | 342/357.01 |
| 2002/0142781 A1 | * | 10/2002 | Wiedeman et al. | 455/456 |
| 2003/0176196 A1 | * | 9/2003 | Hall et al. | 455/456.1 |
| 2005/0148346 A1 | * | 7/2005 | Maloney et al. | 455/456.6 |
| 2006/0187115 A1 | * | 8/2006 | Terashima et al. | 342/357.06 |

* cited by examiner

*Primary Examiner*—Thomas H. Tarcza
*Assistant Examiner*—Shelley Chen

(57) ABSTRACT

The invention relates to a method and a system for determining the position of a device (1) by taking measurements to determine the range between at least a first positioning station (2) and the device (1) and to determine the range between at least a second positioning station (3) and the device (1). At least one measurement defines a geometric surface for the position of the device (1). Said first positioning station (2) and second positioning station (3) belong to different systems. In the invention, the measurements are used to select a geometric model which comprises, at the most, quadratic surfaces, the selected geometric model is simplified to reduce the number of quadratic surfaces, the measurement results are inserted in the simplified geometric model, and the position of the device (1) is determined by solving the simplified geometric model. The invention also relates to a device (1) and a program in which the method is applied, as well as to a storage means for storing the program.

35 Claims, 5 Drawing Sheets

US 7,301,498 B2

INSERTING MEASUREMENTS IN A SIMPLIFIED GEOMETRIC MODEL TO DETERMINE POSITION OF A DEVICE

CROSS-REFERENCE TO RELATED APPLICATIONS

This application claims priority under 35 USC §119 to Finnish Patent Application No. 20035151 filed on Sep. 10, 2003.

FIELD OF THE INVENTION

The present invention relates to a method for determining the position of a device, wherein measurements are taken to determine at least the range between a first positioning station and the device and the range between a second positioning station and the device, and wherein each measurement determines a geometric surface for the position of the device. The invention also relates to a system for determining the position of a device, with means for taking measurements to determine at least the range between a first positioning station and the device and the range between a second positioning station and the device, and means for determining a geometric surface for the position of the device on the basis of the measurements. Furthermore, the invention relates to a device with means for taking measurements to determine at least the range between a first positioning station and the device and the range between a second positioning station and the device, and means for determining a geometric surface for the position of the device on the basis of the measurements. Also, the invention relates to a program and a storage means for storing the program, which program comprises machine-executable program commands for determining the position of a device, which program comprises program commands for taking measurements to determine at least the range between a first positioning station and the device as well as to determine at least the range between a second positioning station and the device, and wherein at least one measurement determines a geometric surface for the position of the device, said first and second positioning stations belonging to different systems.

BACKGROUND OF THE INVENTION

The position of a device or another target can be determined by several different methods. Satellite-based systems are known, which use several satellites orbiting the earth and transmitting signals. The signals transmitted by the satellites are received, and on the basis of the signal reception, various measurements are taken to determine the position of the target. The signal measurement is taken either in the device whose position is to be found out, and/or on an earth station with a known position, such as a base station of a mobile communication network. Such satellite positioning systems include, for example, the GPS (Global Positioning System) and the GLONASS (Global Orbiting Navigation Satellite System). Satellite-based positioning has, for example, the advantage that under favorable conditions, the position can be determined at a relatively high precision. Even relatively inexpensive receivers can be used to determine the position at a precision of even few meters. This is often the case in exposed places, where there are hardly any obstacles to attenuate the satellite signals. Under poor conditions, however, when the signal strength is weak, positioning on the basis of the satellite signals is not necessarily even possible. Such a situation often occurs in cities and particularly indoors, where the signal has to pass through the structures of a building. Furthermore, if the receiver cannot receive signals from a sufficient number of satellites, the position can thus not be determined by means of the satellite positioning system only.

At present, the position of a mobile communication device can be determined by base stations. Thus, measurements are taken on the basis of signals transmitted between the base stations of the mobile communication network and the mobile communication device. In the positioning, for example differences in signal propagation times between the mobile communication device and the different base stations are utilized. In such a system, the positioning accuracy is typically in the order of 100 meters or poorer, depending on the size of the range of the base station, i.e. the size of the cell. The smaller the cell size, the better the positioning accuracy. The size of a cell is not necessarily the same but it may vary. Normally, there are more base stations, i.e. the cell size is smaller, in densely populated areas, such as cities, whereas in regions with less population there are fewer base stations, i.e. the cell size is larger. If directional antennas are used at the base stations, the positioning accuracy can be improved to some extent. An advantage in such base-station based positioning is, for example, the fact that its application does not require the use of a separate positioning receiver, but a mobile communication device can be used for the positioning.

Positioning devices have also been developed, in which the above-presented methods have been combined. In such a hybrid system, both satellites and base stations are used for determining the position of the device.

In satellite-based positioning, the signals from at least three different satellites must be received to produce a three-dimensional position solution (x, y, z: latitude, longitude and altitude), if the exact time data is known in the receiver. For example in satellites of the GPS system, highly accurate atomic clocks are used, whose working accuracy is controlled at earth stations. If necessary, the time data of the satellite clocks can be adjusted on the basis of measurements taken by these earth stations. In conventional commercial positioning receivers, however, it is not possible to use such atomic clocks, e.g. for the reason that they are extremely valuable and require relatively constant ambient conditions to secure their reliable operation. In this case, the signal of a fourth satellite is still needed to determine the time error as well.

In base-station based positioning, the mobile communication device must receive the signals of at least two base stations to be able to determine the position of the receiver in two dimensions (x,y: latitude and longitude). On the other hand, base-station based positioning can also be performed vice versa; that is, the signal of the mobile communication device is received at two or more base stations and the two-dimensional positioning is performed on the basis of the signals received by the base stations. Three-dimensional positioning is not possible in base-station based positioning systems known at the present.

In positioning systems of prior art, the position is to be determined iteratively by means of non-linear equation sets. Furthermore, it is possible to use overdetermination; that is, there are more equations than unknown variables to be solved. In practice, this means the number of received signals exceeds the minimum. For solving the equation sets, it is possible to use, for example, the least mean squares method and to look for a minimum. The problem is, for example, that if a default position has been used and it is significantly incorrect, or if different measurements are weighted in an inadvantageous way, the iterative computation may result in the finding of an incorrect minimum point. This means that the determined position is not correct.

SUMMARY OF THE INVENTION

It is an aim of the present invention to provide an improved method and a system for positioning, as well as a device in which the method is applied. In the invention, instead of iterative computation, closed computation is utilized to find the position solution. In the solution, instead of overdetermination, a minimum number of measurement results or, in practice, the measurement of three different signals is used to find a three-dimensional position solution. The invention is based on the idea that the measurements to be taken are used to determine geometric surfaces whose points of intersection are determined by computation. One of such points of intersection is closest to the real position, wherein the coordinate data of this point of intersection can be used as the position solution. Geometric surfaces are, at the most, quadratic surfaces (quadrics). Furthermore, the aim is that as few of the determined surfaces as possible are quadratic surfaces, preferably only one, the other surfaces being planes. To put it more precisely, the method according to the present invention is primarily characterized in that in the method, on the basis of measurements, a geometric model is selected which comprises, at the most, quadratic surfaces, the selected geometric model is simplified to reduce the number of quadratic surfaces, the measurement results are inserted in a simplified geometric model, and the position of the device is determined by solving the simplified geometric model. The system according to the present invention is primarily characterized in that the system comprises means for selecting, on the basis of measurements, a geometric model comprising, at the most, quadratic surfaces, means for simplifying the selected geometric model to reduce the number of quadratic surfaces, means for inserting measurement results in the simplified geometric model, and means for solving the simplified geometric model to determine the position of a device. Furthermore, the device according to the present invention is primarily characterized in that the device comprises means for selecting, on the basis of measurements, a geometric model comprising, at the most, quadratic surfaces, means for simplifying the selected geometric model to reduce the number of quadratic surfaces, means for inserting measurement results in the simplified geometric model, and means for solving the simplified geometric model to determine the position of the device. The program according to the present invention is primarily characterized in that the program also comprises program commands for selecting, on the basis of measurements, a geometric model which comprises, at the most, quadratic surfaces, simplifying the selected geometric model to reduce the number of quadratic surfaces, inserting the measurement results in the simplified geometric model, and determining the position of the device by solving the simplified geometric model.

Moreover, the storage means according to the present invention is primarily characterized in that the program stored in the storage means also comprises program commands for selecting, on the basis of measurements, a geometric model which comprises, at the most, quadratic surfaces, simplifying the selected geometric model to reduce the number of quadratic surfaces, inserting the measurement results in the simplified geometric model, and determining the position of the device by solving the simplified geometric model.

The present invention shows advantages over solutions of prior art. In the method according to the invention, there are significantly fewer computations than, for example, in solutions based on iterative computation. Thus, the device may require less computing capacity. When applying the method according to the invention, it is possible to achieve all the possible position solutions, from which the correct one can be determined by a suitable criterion. However, the iterative method only gives one position solution which may, however, not be correct. Furthermore, the positioning is faster, which also reduces the power consumption of the device. The positioning also works better under poor signal conditions compared with systems based on satellites only. The method according to the invention can also be used in a situation in which the number of measurements available is not sufficient for methods applying overdetermination.

DESCRIPTION OF THE DRAWINGS

In the following, the invention will be described in more detail with reference to the appended drawings, in which.

DETAILED DESCRIPTION OF A PREFERRED EMBODIMENT OF THE INVENTION

Figure 1:
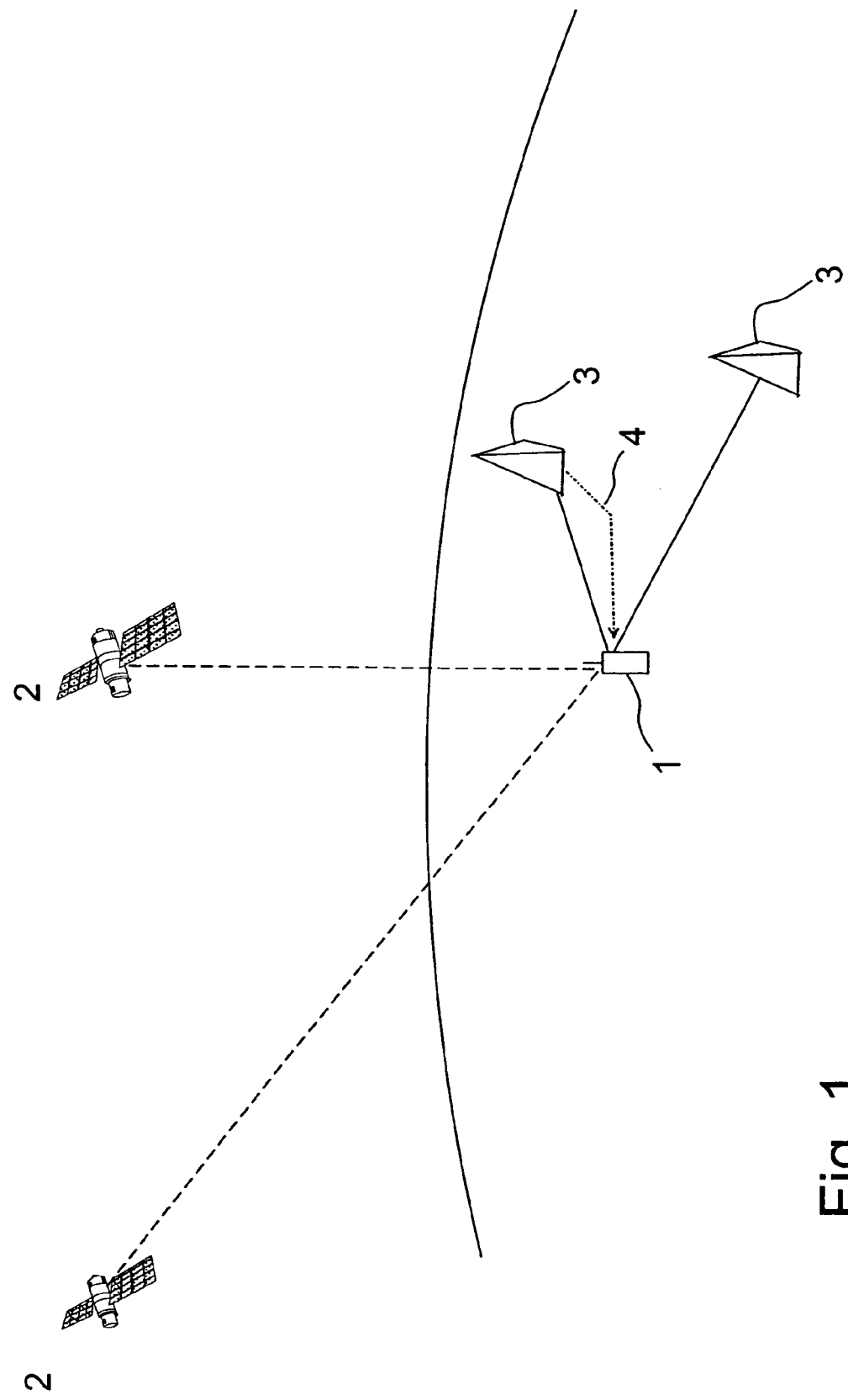
FIG. 1 shows an example of positioning applying the method according to the invention.

The following is a description of the method according to a preferred embodiment of the invention in the situation of FIG. 1. Signals transmitted by different transmitters are received in a device 1. The device 1 tries to receive signals transmitted from at least two different systems. In the method according to the invention, preferably a satellite positioning system and base stations of a mobile communication network are used, wherein the signals can be signals from satellites 2 and signals from base stations 3. In this description, such transmitting stations will also be jointly called positioning stations. On the basis of the signals, the aim is to find out various measurement results, such as the range and/or pseudo range between the positioning station which transmitted the signal and the target, and the difference in the range between one positioning station and the target, i.e. the device 1, and the range (or pseudo range) between a second positioning station and the device 1. Furthermore, the aim may be to determine the time difference between the clock of the device 1 and the time of the satellite system.

The method according to the invention can be advantageously divided into four steps in the following way: In a measuring step, the signals are received and the measurements are taken on the basis of the received signals. If necessary, the measurement results are further evaluated to find out which measurements are useful for the positioning. After taking a sufficient number of useful measurements, a conversion step is taken to produce, from the measurement results, equation sets in geometric format. Furthermore, the geometry is simplified, if possible. The simplification is made, for example, by reduction or in another suitable way. The aim is to determine a solution which can be defined by means of points of intersection between a quadratic surface and a line, preferably between a quadratic surface and a straight line. In a solution step after the conversion step, a solution is sought for the geometric problem, i.e. the points of intersection are sought between the different geometric forms. A problem with a minimal definition normally produces two different solutions, wherein an auxiliary criterion can be used to find out, which solution is the correct one. Such auxiliary criteria may be, for example, the maximum/minimum range between the device 1 and the base station 3, the maximum/minimum altitude, etc. This information can be obtained, for example, as separate auxiliary data from the base station 3 (line 4 in FIG. 1). In an estimation step after the solution step, the aim is to estimate the error of the solution obtained in the solution step, and preferably also to compare the solution and/or the error with some predetermined limit values.

Next, we shall discuss the above-described different steps in more detail. Let us presume that the aim is to determine the three-dimensional position of the device 1. Furthermore, let us presume that the position of the device 1 is known at some accuracy, for example, at the precision of some hundreds of meters. In some cases, this default position may be even more accurate, for example in the order of the size of a cell in a GSM mobile communication network. On the basis of this after presumption, it is possible to slightly simplify the geometry to be used for determining the position solution. To solve the problem, a local coordinate system is applied, in this example the ENU (East-North-Up) coordinate system, in which the origin is set at a reference point which is sufficiently close to the default position of the device 1.

However, the invention is not limited to such a coordinate system, but it can be easily generalized to other coordinate systems as well, such as the Earth-Centered Earth-Fixed (ECEF) coordinate system and a randomly selected reference point.

The positioning stations can be relatively close to the user's device 1, such as the base stations 3 of the mobile communication network, or far from the device 1, such as the satellites 2. In the case of positioning stations located far away, it can be presumed that the range vector between the device 1 and the positioning station is constant in the whole area to be examined, i.e. in the area where the device 1 is presumed to be located. For example in the case of the satellites of the GPS system, the error caused by this presumption is not more than 2.5 m, when the device 1 is at a range of not more than 10 km from the reference point.

Measurements

Let us denote the location of the device 1 with $x=[x,y,z]^T$ and the positions of the positioning stations with the vectors $s_1, s_2, \ldots, s_{n_s}$. The measurement types used in the method, and the corresponding equations are the following:

The range between the device 1 and the positioning station 2, 3 is denoted with the equation:

$\|s_i-x\|=m_i$, in which i indicates the number of the measurement. (1)

The biased range (pseudo range) between the device 1 and the base station 3 is denoted with the equation:

$\|s_i-x\|+\beta_i=m_i$ (2)

The biased range (pseudo range) between the device 1 and the satellite 2 is denoted with the equation:

$$-\frac{s_i^T}{\|s_i\|}x + \beta_i = m_i - \|s_i\| \quad (3)$$

Finally, the altitude measurement of the device 1 is denoted with the equation:

$u_{up}^T x = m_i$ (4)

The measurement equation of the distant pseudo range according to equation (3) is based on the first degree Taylor's approximation $$\|s-x\| \approx \|s\| - \frac{s^T}{\|s\|}x.$$

When $\|x\|<\|s\|$, it can be shown that the approximation error is, at the most, in the order of $$\frac{1}{2}\frac{\|x\|^2\|s\|^2}{(\|s\|-\|x\|)^3} \approx \frac{1}{2}\frac{\|x\|^2}{\|s\|}.$$

The estimate $\beta_i$ for the time error of the clock of the device 1, i.e. the estimated difference between the time data of the device 1 itself and the time of the positioning station, may be the same in different measurements, if the positioning stations have been synchronized with each other. In a situation in which the time is not synchronized between the positioning stations belonging to different systems, different time error estimates are normally needed for different measurements. Such a situation is, for example, in the case where the mobile communication network is not synchronized with the time data of the satellite positioning system.

In the equations (1) to (4) above the term $m_i$ is not necessarily the same. For example, in equation (1) the range measurement can be used directly and in equation (2) the pseudo range measurement can be used while in equations (3) and (4) the term $m_i$ depends on the selection of the local coordinates. In equation (4) the altitude measurement is performed in relation to the local coordinates and the term $m_i$ of equation (3) is the pseudo range measurement with respect to the local coordinates. In equation (3) the term $m_i$ can be calculated by subtracting the norm of the location vector of the positioning station from the measured pseudo range.

Geometric Model

Next, we shall discuss a geometrical model used for determining the positioning solution. This geometric model consists of three-dimensional surfaces in such a way that the position of the device 1 is at one of the common points of intersection of the different surfaces. Naturally, this presumption is true in such cases in which there are no errors. In practice, the common point of intersection is usually not quite precisely the same as the real position of the device 1. Each surface represents one measurement (e.g. range or altitude) or measurement pair (e.g. difference in pseudo ranges).

The range measurement (1) defines a sphere whose center is located at the location $s_{n_s}$ of the positioning station. Thus, the presumed position of the device 1 is at some point on this spherical surface.

The pseudo range measurements (2) and (3) include a time error term $\beta_i$ which can be eliminated by forming measurement pairs, wherein the measurement pair defines the range difference. If the positioning stations of different systems are not synchronized with each other, the measurement pairs used must be such measurements in which the positioning stations belong to the same system. Consequently, such measurement pairs can be formed of pseudo range measurements between two satellites 2 and the device 1, as well as pseudo range measurements between two base stations 3 and the device 1.

When satellites 2 are used for forming the measurement pairs, the range difference computed on the basis of the measurements defines a planar surface. Thus, n satellite measurements will define n−1 planes. This is true with the above-presented presumption that the device 1 is located relatively close to the reference point.

The measurement pairs may also be a satellite 2 and a base station 3, if the base stations have been synchronized with each other, i.e., the base stations are in synchronization with the time data of the satellite system. The range difference formed in this way will define a paraboloid. Thus, all the measurement pairs are formed preferably by using the same satellite. Thus, n pseudo range measurements will define n paraboloids with the pseudo range measurement of one satellite.

When base stations 3 or other earth stations are used as the measurement pairs, each measurement pair will define a hyperboloid or, in fact, one sheet of a two-sheeted hyperboloid. In this invention, measurement pairs of two base stations will only be used in situations in which the base stations are not in synchronization with the satellites, as well as in situations in which measurements cannot be taken from satellite signals in a sufficiently reliable way. In this case, n pseudo range measurements will define n−1 hyperboloids.

Furthermore, the altitude measurement (4) will define a plane which is parallel to the ground surface.

In the geometric model according to the present invention, the surfaces used are either planar or quadratic surfaces. The planar surfaces can be generally represented by the formula:

$$n_j^T x = a_j \qquad (5)$$

In a corresponding manner, the quadratic surfaces can be represented by parts of a quadratic surface of revolution with the following formula:

$$\|s_j - x\| + n_j^T x = a_j \qquad (6)$$

in which j denotes the index of the surface. Several surfaces may comprise the same positioning station. The length of the vector $n_j^T$ defines the type of the quadratic surface as follows: if $\|n_i\| > 1$, it is a hyperboloid; with the value $\|n_i\| = 1$ it is a paraboloid; if $n_i = 0$, the surface is a spherical surface; and finally, in the case of an ellipsoid surface, $0 < \|n_i\| < 1$. However, in hybrid positioning systems applying the method according to this invention, there is normally no need to use ellipsoid surfaces.

It can be clearly seen that when the range difference is formed from measurements between the base station 3 and the satellite 2, the surface complies with the equation (6), in which the first term corresponds to the pseudo range measurement between the base station 3 and the device 1, and the second term corresponds to the pseudo range measurement between the satellite 2 and the device 1.

Next, we shall determine the equation of the surface defined by the range difference. The range difference is determined by subtracting the pseudo ranges between two base stations 3 and the device 1 from each other. This results in the equation $$\|s_i - x\| - \|s_j - x\| = d_{i,j} \qquad (7)$$

in which i is the index of the first base station and j is the index of the second base station. This equation can be rearranged in the form $$\|s_i - x\| + \frac{s_i - s_j^T}{d_{i,j}} \qquad (8)$$

$$x = \frac{d_{i,j}^2 + \|s_i\|^2 - \|s_j\|^2}{2 d_{i,j}}$$

It can be seen that the equation (8) has the same form as the equation (6); in other words, it is a quadratic surface of revolution.

The aim is to select the measurements so that the geometric model to be used in the position solution is as simple as possible. For example, if pseudo range measurements of both satellites and base stations are available, the aim is preferably to form as many differences in the satellite pseudo ranges as possible, because planar surfaces are involved. Furthermore, one or more differences in the pseudo ranges between satellites and base stations are made in the form of paraboloid surfaces. The difference in the pseudo ranges of the base stations (=hyperboloid surface) is preferably used only when there are no satellite pseudo range measurements available, or when the base stations are not synchronized with the time of the satellite system.

In the present invention, the aim is to simplify the geometric model further so that in the geometry to be solved, there is, at the most, one quadratic i.e. second-degree surface in addition to planar surfaces and/or lines. This is achieved by using the feature, known as such, by which the points of intersection of two confocal quadratic surfaces can be solved by replacing one of these quadratic surfaces with a plane. Thus, the points of intersection of the plane and the other quadratic surface are the same as the points of intersection of the original quadratic surfaces.

The intersection of two quadratic surfaces can be solved by the equation $$\begin{cases} \|s_i - x\| + n_i^T x = a_i \\ \|s_j - x\| + n_j^T x = a_j \end{cases} \qquad (9)$$

in which either $s_i = s_j$ or $n_i = n_j$. In the first case ($s_i = s_j$), the geometric model of the equation (9) is reduced to the form $$\begin{cases} \|s_i - x\| + n_i^T x = a_i \\ (n_i - n_j)^T x = a_i - a_j, \end{cases} \qquad (10)$$

wherein it is an intersection of a quadratic surface and a plane.

In a corresponding manner, in the latter case ($n_i = n_j$), the geometric model of the equation (9) is reduced to the form $$\begin{cases} \|s_i - x\| + n_i^T x = a_i \\ 2((a_i - a_j)n_i + s_j - s_i)^T x = a_i^2 - a_j^2 + \|s_j\|^2 - \|s_i\|^2, \end{cases} \quad (11)$$

which is also an intersection of a quadratic surface and a plane.

Most points of intersection between a plane, a quadratic surface and another quadratic surface can be solved by using these reduced formulae (10) and (11). Even quadratic-quadratic-quadratic cases can be converted to a line-quadratic case by performing the reduction twice. However, it should be noted that the reduction is only possible in such situations in which each pair of two quadratic surfaces has a common focus. The reduction of the geometric model to the line-quadratic case can also be made, if all the positioning stations are synchronized with each other.

Geometric Solution

After the geometric model has been reduced to the form of an intersection between a line and a quadratic surface, the set of equations can be solved to determine the position of the device 1. The intersection of a line and a quadratic surface can be presented by the equation $$\begin{cases} u_1^T x = d_1 \\ u_2^T x = d_2 \\ \|s - x\| + n^T x = a, \end{cases} \quad (12)$$

This can be solved, for example, in the following way. An equation is formed for the line to fulfill two linear equations in the equation (12).

$$x = p + tw, \; t \in R \quad (13)$$

In the equation (13), w is the unit direction vector of the line, which is derived from the equation $$w = \frac{u_1 \times u_2}{\|u_1 \times u_2\|} \quad (14)$$

and p is a point on said line. To facilitate further computations, p can be selected so that it fulfills the following equation $$(s-p)^T w = (a - n^T p) n^T w \quad (15)$$

Except for some non-convergent cases, this equation has an unequivocal solution which can be determined by means of the following linear set of equations.

$$\begin{bmatrix} u_1^T \\ u_2^T \\ ((w^T n)n - w)^T \end{bmatrix} p = \begin{bmatrix} d_1 \\ d_2 \\ (an - s)^T w \end{bmatrix} \quad (16)$$

In the set of equations (12), replacing the variable x with the definition according to equation (13) will give the following equation:

$$\|s - (p + tw)\| + n^T (p + tw) = a \quad (17)$$

From this, it can be seen that t is the only variable in the equation. The above-presented selection of p has the result that the first-degree terms can be eliminated by squaring the equation (17) and rearranging the terms. This results in the following equation:

$$[1 - (n^T w)^2] t^2 = (a - n^T p)^2 - \|s - p\|^2 \quad (18)$$

When t is solved from this equation (18) and the solved t is inserted in the equation (13), the position to be searched can be presented by the equation:

$$x = p \pm \sqrt{\frac{(a - n^T p)^2 - \|s - p\|^2}{1 - (n^T w)^2}} w \quad (19)$$

The equation (19) can have two solutions, one solution or no solution, depending on the sign of the term (discriminant) under the square root. A situation, in which no solutions are obtained for the equation, may be due to e.g. great measurement errors. Thus, the value p can be considered a good default value for the position x, or the position can be determined by computing e.g. by the least mean squares method, in which the different measurements are possibly weighted in different ways.

EXAMPLE

Figure 3A:
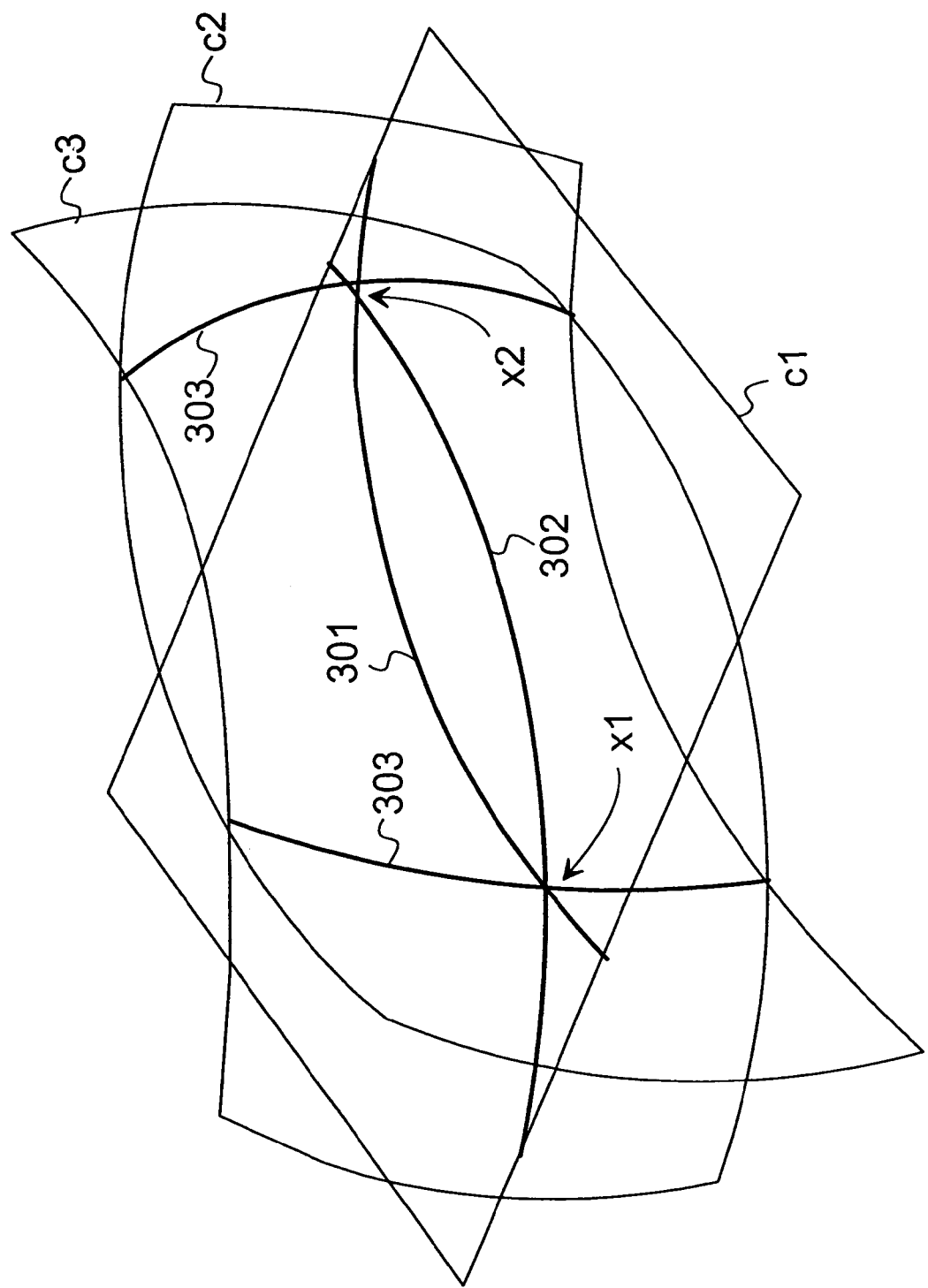
FIG. 3a illustrates positioning by means of three different surfaces.

Next, we shall present the solution of points of intersection between a plane and two quadratic surfaces in an example situation. Let us presume that we have an altitude measurement, one pseudo range measurement to satellite 2 and two pseudo range measurements to base stations 3, which have been synchronized with the time data of the satellite positioning system. The geometric model corresponding to this situation is shown in FIG. 3a. In FIG. 3a, the plane is denoted with the reference c1, the first quadratic surface with the reference c2, and the second quadratic surface with the reference c3. The curve of intersection between the plane c1 and the first quadratic surface c2 is denoted with the reference 301. In a corresponding manner, the curve of intersection between the plane c1 and the second quadratic surface c3 is denoted with the reference 302. Furthermore, the curve of intersection of the first quadratic surface c2 and the second quadratic surface c3 is denoted with the reference 303 in FIG. 3a. The plane c1 is determined by the altitude measurement $$u_{up}^T x = m_1 \quad (20)$$

The quadratic surfaces c2, c3 are formed by subtracting the pseudo range of the satellite (equation 3)

$$-\frac{s_2^T}{\|s_2\|} x + \beta = m_2 - \|s_2\| \quad (21)$$

from the pseudo ranges of both base stations (equation 2)

$$\|s_3 - x\| \beta = m_3$$

$$\|s_4 - x\| \beta = m_4 \quad (22)$$

Thus, the quadratic surfaces c2, c3 can be presented in the form $$\|s_3 - x\| + \frac{s_2^T}{\|s_2\|} x = m_3 - m_2 + \|s_2\| \tag{23}$$

$$\|s_4 - x\| + \frac{s_2^T}{\|s_2\|} x = m_4 - m_2 + \|s_2\| \tag{24}$$

In this case, the condition $n_i = n_j$ is true, wherein, according to the equation (11), the geometry of the quadratic surfaces c2, c3 according to the equations (23) and (24) can be reduced to an intersection between the first quadratic surface (23) and the plane. This plane can be defined as follows.

$$2\left((m_3 - m_4)\frac{s_2}{\|s_2\|} + s_4 - s_3\right)^T x =$$
$$(m_3 - m_2 + \|s_2\|)^2 - (m_4 - m_2 + \|s_2\|)^2 + \|s_4\|^2 - \|s_3\|^2 \tag{25}$$

Figure 3B:
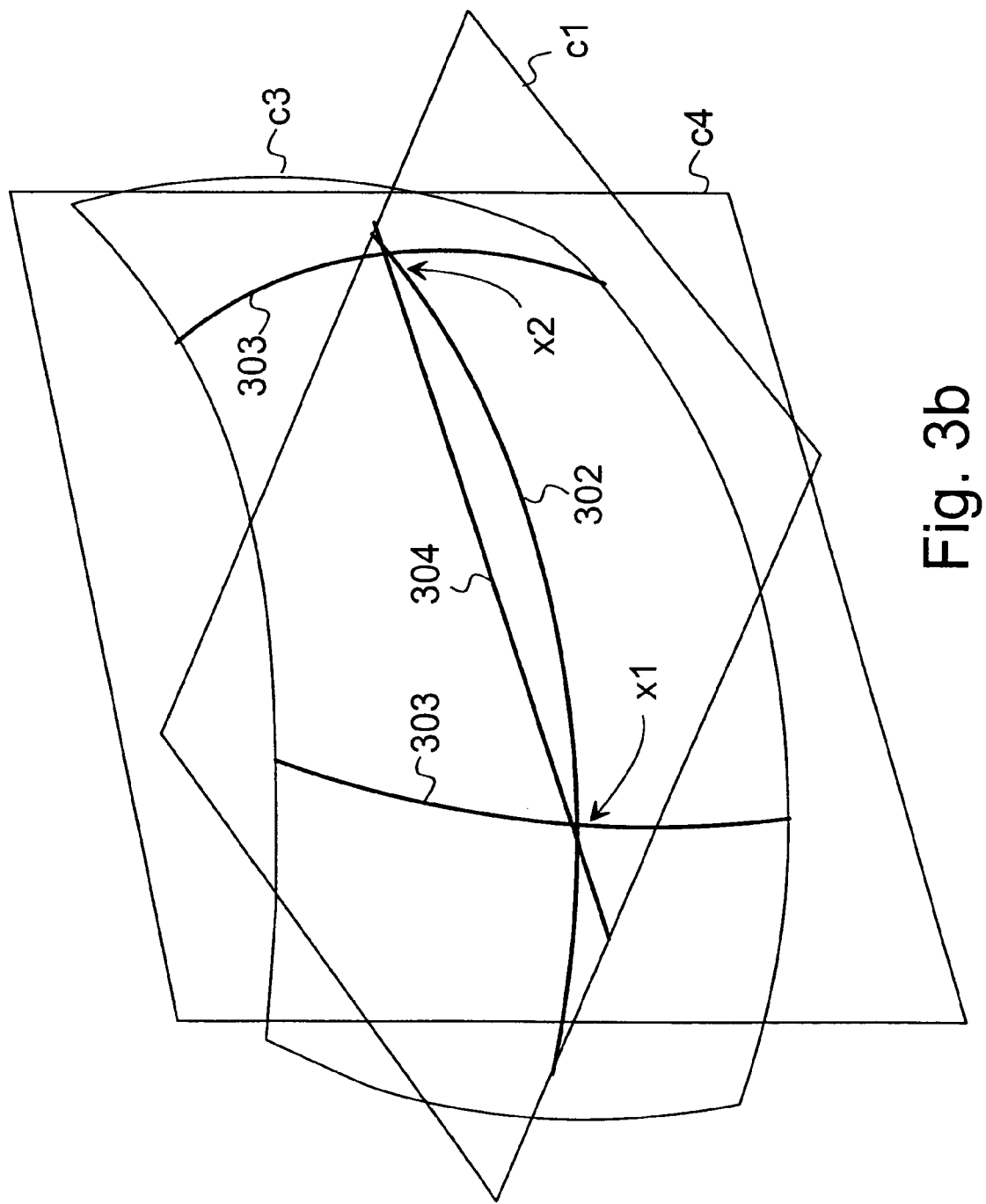
FIG. 3b shows the situation of FIG. 3a modified so that one quadratic surface is replaced with a planar surface.

Consequently, to determine the position, one must solve the points of intersection of the two planes (20) and (25) and one quadratic surface (23). FIG. 3b illustrates this geometric model reduced from the situation of FIG. 3a. In the example of FIG. 3b, the first quadratic surface c2 of FIG. 3a has been replaced with the plane c4. Furthermore, in FIG. 3b, reference 304 denotes the curve of intersection between this second plane c4 and the first plane c1. The curve of intersection 303 between the second plane c4 and the first quadratic surface c2 is the same as the curve of intersection 303 between the first quadratic surface c2 and the second quadratic surface c3 in the example of FIG. 3a. In FIGS. 3a and 3b, the position solution is denoted with the references x1 and x2.

Geometric Solution of a Plane and Two Quadratic Surfaces

In some cases, the geometric model to be solved is not reduced to an intersection between a line or a plane and a quadratic surface, but the points of intersection between a plane and two quadratic surfaces must be solved. Such a situation normally occurs when the quadratic surfaces do not have a common focus, for example when there is only one satellite pseudo range measurement and several pseudo range measurements of base stations.

Figure 3C:
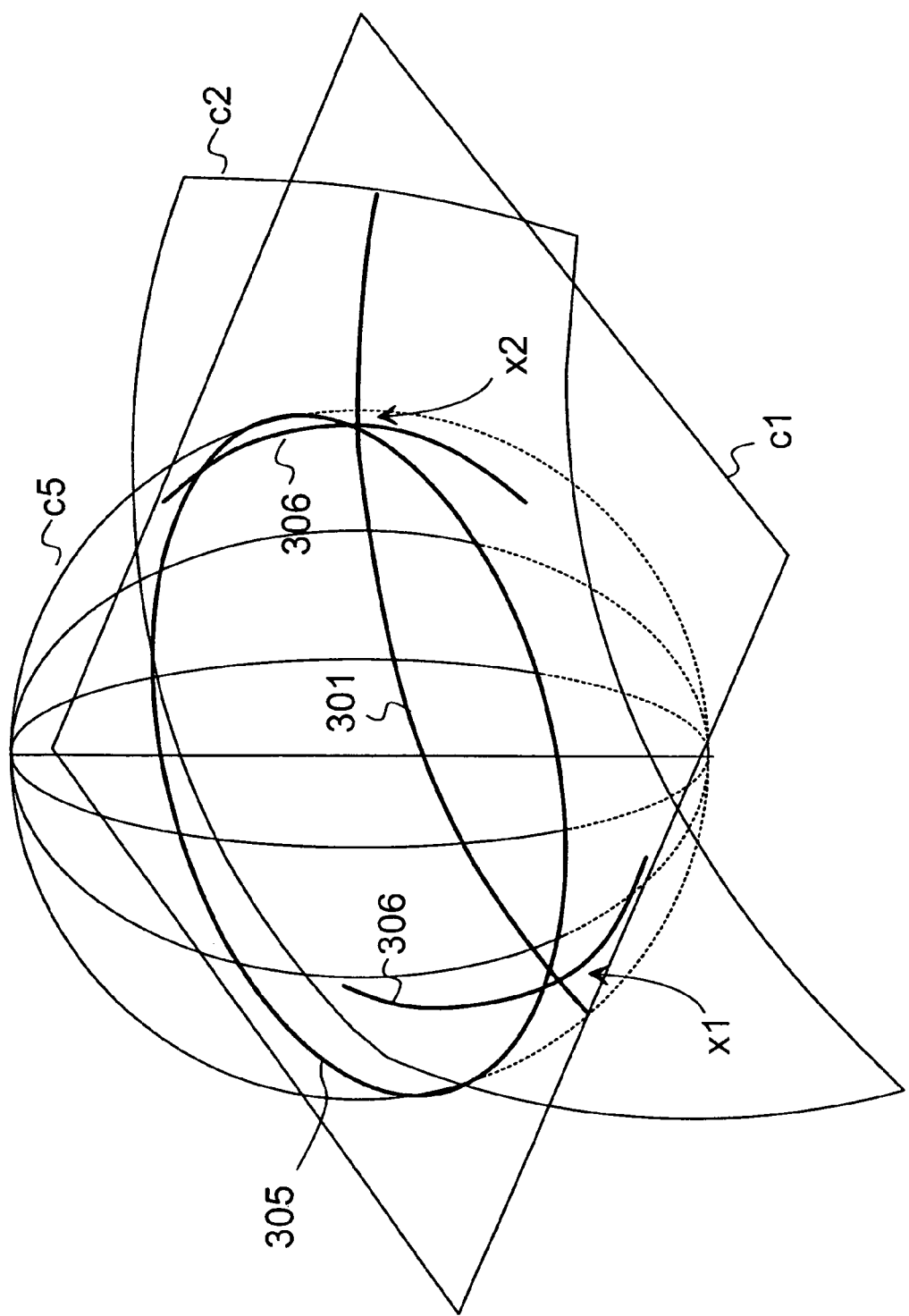
FIG. 3c shows a situation in which the geometric model comprises a plane and two quadratic surfaces, one of them being a spherical surface.

Next, the problem will be first simplified by presuming that one of the quadratic surfaces is a spherical surface. This corresponds, for example, to a situation in which at least one of the measurements is the range measurement of a base station, determining a spherical surface whose center is the location of the base station 3 and whose radius is the measured range between the device 1 and the base station 3. This case is illustrated in FIG. 3c. The spherical surface is denoted with the reference c5. Furthermore, reference 305 denotes the curve of intersection between the spherical surface c5 and the plane c1. The curves of intersection between the spherical surface c5 and the first quadratic surface c2 are denoted with the reference 306. The curve of intersection between the plane c1 and the first quadratic surface is denoted with the reference 301. In FIGS. 3a and 3b, the position solution is denoted with the references x1 and x2. Now, the geometric model can be presented by the set of equations $$\begin{cases} u^T x = a, \|u\| = 1 \\ \|q - x\| = c \\ \|s - x\| + n^T x = b \end{cases} \tag{26}$$

If u and n are not parallel, the set of equations (26) can be solved by first forming the intersection between the plane and the spherical surface. This intersection defines a circle which fulfills the equation $$x = p + tv \pm \sqrt{1 - t^2} w, -1 \leq t \leq 1 \tag{27}$$

in which $$p = q + (a - u^T q)u \tag{28}$$

$$w = r\frac{u \times n}{\|u \times n\|}, v = u \times w \tag{29}$$

$$r = \sqrt{c^2 - (a - u^T q)^2} \tag{30}$$

Next, the equation (27) is inserted in the third equation of the set of equations (26), wherein rearranging and squaring twice will result in the fourth-degree polynomial $$a_1^2 t^4 + 2a_1 a_2 t^3 + (a_2^2 + 2a_1 a_3 + a_4^2)t^2 + 2a_2 a_3 t + a_3^2 - {}_4^2 \tag{31}$$

in which $$a_1 = (n^T v)^2$$

$$a_2 = 2[s + (n^T p - b)n - p]^T v$$

$$a_3 = b^2 - r^2 - \|s\|^2 + [2s + (n^T p - 2b)n - p]^T p$$

$$a_4 = 2(s - p)^T w \tag{32}$$

The set of equations (26) can be solved by finding the real roots of the polynomial (31) and inserting them in the equation (27). Depending on the case, the number of solutions for the set of equations (26) is four, three, two, one or no solutions.

When the possible solutions have been found out and the number of solutions is more than one, the correct solution can be determined by some criterion. Such criteria may include, for example, a maximum/minimum value for the range from a given point, such as the position of the base station, a maximum/minimum value for the altitude, a deviation from the position given by the previous positioning, etc.

Application of the Method

In practical applications, the method according to the invention can be used for positioning the device 1 e.g. when a sufficient number of measurements is not available for conventional, overdetermined positioning. Thus, in the device 1, a set of measurements is preferably selected, to which the closed computation according to the method is applied to solve the solution. To select this set of measurements, it is possible e.g. to find out, if sufficiently strong satellite signals can be received, and in the positive case, how many different satellite signals can be received. After this, yet another or more base station measurements are selected to have a sufficient number of measurements available. Instead of one base station measurement or satellite measurement, it is also possible to use altitude measurement, if the device 1 has means for measuring the altitude or for receiving the altitude measurement data from an external source, such as a separate altitude measurement device, a terrestrial measurement system or auxiliary altitude data from a mobile communication network. To solve the position, the device 1 selects the geometric model to be used on the basis of the type of measurements available. Furthermore, the selected geometric model is reduced to simplify the computation, as presented above in this description. After the solution has been found, it can be used as a default position for the device 1. Thus, in a situation in which the number of measurements available exceeds the minimum, it is possible to apply e.g. the least mean squares method of the prior art, wherein the position determined by the method according to the invention is first set as a default position. This ensures that a solution according to the least mean square is obtained, because the solution found by the method according to the invention has the result that the computation of the least mean square is very likely to converge towards the correct minimum, irrespective of the possible weighting of the measurements.

The invention can also be applied in an overdetermined situation preferably by dividing the overdetermined positioning into several partial systems in which closed computation is used. In this way, several solutions will be achieved, on the basis of which the correct position can be determined at a relatively high precision. For example, if each subsystem gives two or more solutions, the correct solution can be found out by examining which one of the solutions is substantially the same in all the subsystems. Thus, this solution substantially corresponds to the position of the device 1 at a high probability. From substantially the same solutions given by the different subsystems, it is still possible to determine e.g. the mass center, the average, or the like, to be used as the position data for the device 1.

Figure 2:
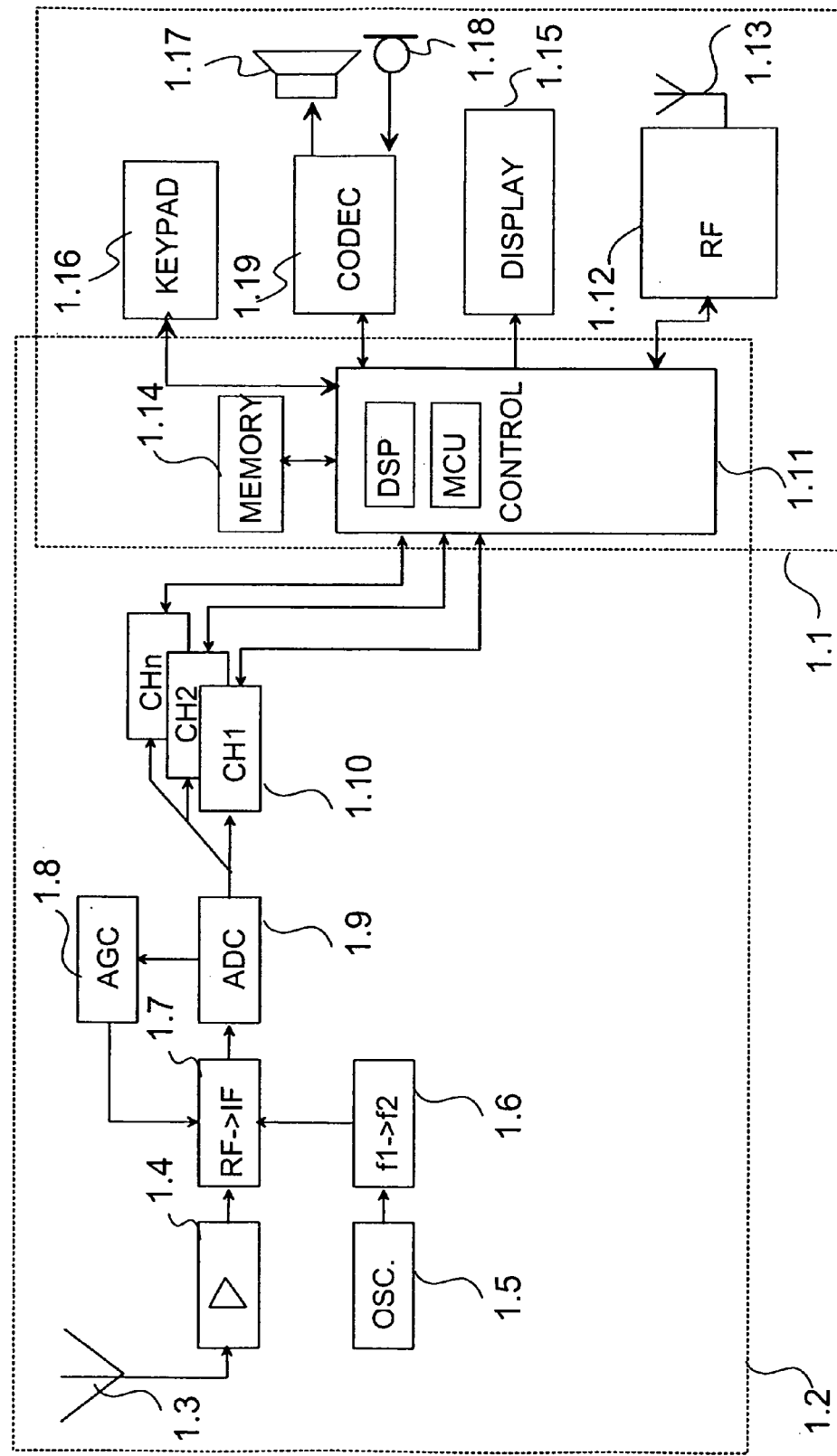
FIG. 2 shows a device according to a preferred embodiment of the invention in a reduced block diagram.

FIG. 2 shows an example of the device 1, in which the invention can be applied. The device 1 comprises a positioning receiver 1.2 and a wireless communication device 1.1, but it will be evident that the invention is not limited to this embodiment only. The device 1 according to the invention can also be applied, within the scope of the present invention, as a separate electronic device without being connected to another device.

A majority of the steps of the method according to the invention can be implemented by software, as program commands in the processor, such as a digital signal processor (DSP), in the control block 1.11. For the positioning according to the invention, pseudo ranges must be measured to at least one different satellite $SV_i$. The positioning receiver 1.2 comprises at least one receiving channel, but in practice, there are normally at least four or even twelve receiving channels. It is thus possible to receive the signals of more than one satellite simultaneously. In FIG. 2, the block chart of the positioning receiver 1.2 shows, for clarity, the structure of only one such receiving channel, the other receiving channels being preferably substantially identical. The repetition-coded signal to be received via an antenna 1.3 is amplified in a high-frequency amplifier 1.4 and converted by means of a clock signal generated by a clock generator 1.5 and a frequency synthesizer 1.6 preferably to an intermediate frequency or directly to a baseband in a converter block 1.7. At this stage, the signal is preferably still in analog format, wherein it is converted to a digital signal in an analog-to-digital converter 1.8. The analog-to-digital converter 1.9 provides not only a digital receiving signal but also a control to an automatic gain control (AGC) block 1.8 to level out variations in strength of the received signal in a way known as such. The digital signal converted to an intermediate frequency or to the baseband is led to a digital monitoring block 110, to find out the carrier frequency of the received signal. As the difference between these carrier frequencies determined in the different blocks and the known transmission frequency, the pseudo range measurements for the different satellites are obtained, to be used in the above-described geometric model. Some of the above-mentioned blocks of the receiving channel may be common to all the receiving channels, such as the antenna 1.3 and the high-frequency amplifier 1.4.

The device 1 also uses at least one base station measurement in addition to the satellite measurements. These base station measurements can be taken either in the device 1 or in the mobile communication network. If the measurements are taken in the device 1, this takes place preferably in the following way. The device 1 transmits to a base station 3, preferably at least to the serving base station, a signal which is received at the base station 3. The base station 3 transmits the signal back to the device 1 which measures the time difference between the moment of transmission and the moment of reception. If necessary, the delay caused between the signal reception and retransmission at the base station is subtracted from this time, if such data is known. After subtracting such an internal delay (delays), the time of the signal propagation to and fro is known. Dividing the time by two and by the speed of light will give the range between the base station 3 and the device 1, to be used for the positioning computation. Normally, the position of the base station 3 is also known, wherein this position data can be used as the center of the sphere whose radius is obtained from the above-mentioned data of the range between the base station 3 and the device 1. The measurement is taken for several base stations, if there is a need to use more than one base station measurement.

However, if the base station measurements are taken in the mobile communication network, preferably the following steps are taken. The base station a3 transmits to the device 1 a signal, on the basis of which the device 1 retransmits the signal to the base station 3. Now, in a corresponding manner, the base station can determine the data of the range between the base station 3 and the device 1. In some situations, the same signal can be received by more than one base station, wherein it is possible to determine the ranges between the device 1 and several base stations. However, this requires that the base stations are synchronized with each other to determine the moment of transmission of the signal at the different base stations.

If necessary, the device 1 is informed of whether the positioning stations 2, 3 of the different systems are synchronized with each other, insofar as pseudo range measurement pairs are used in the device 1. As already disclosed earlier in this description, positioning stations of different systems can only be used as measurement pairs when they are synchronized with each other. Consequently, measurement pairs can be formed of pseudo range measurements between e.g. one satellite 2 and the device 1 and pseudo range measurements between one base station 3 and the device 1. If there is no synchronization between the positioning stations of different systems, the device 1 selects, for the measurement pairs, such measurements in which the positioning stations 2, 3 belong to the same system. Consequently, such measurement pairs can be formed of pseudo range measurements between two satellites 2 and the device 1, and pseudo range measurements between two base stations 3 and the device 1.

In practice, there may be situations, in which there is no satellite measurement available. In such a case, the device 1 attempts to form a sufficient number of base station/base station measurement pairs, whose measurement results will be used for solving the position.

Table 1 shows briefly some various measurement alternatives, on the basis of which the geometrical model to be reduced is formed by using the measurements as such and/or by forming measurement pairs of different measurements.

The measurements can be an altitude measurement A, a range measurement B between the base station (3) and the device (1), a synchronized pseudo range measurement D between the base station (3) and the device (1), a non-synchronized pseudo range measurement E between the base station (3) and the device (1), and a pseudo range measurement G between the satellite (2) and the device (1).

TABLE 1

| | Measurements |
|---|---|
| 1 | ABEE |
| 2 | ABGG |
| 3 | ADDD |
| 4 | ADDG |
| 5 | ADGG |
| 6 | AEEE |
| 7 | AEEGG |
| 8 | AGGG |
| 9 | BEEE |
| 10 | BEEGG |
| 11 | BGGG |
| 12 | DDDG |
| 13 | DDGG |
| 14 | DGGG |
| 15 | EEEGG |
| 16 | EEGGG |

In a majority of the measurement alternatives, it will be sufficient to have four different measurements available. In some cases, however, the problem with a minimal definition will require the use of five measurements.

The present invention can be applied in connection with a number of systems. For example, the mobile communication system can be GSM, UMTS, or another mobile communication system known as such. Instead of or in addition to the mobile communication system, it is also possible to use another terrestrial network of transmission stations, such as the LORAN-C. In a corresponding manner, the satellite positioning system may be GPS, GLONASS and/or another positioning system, in which the positioning stations are relatively distant from the device 1. Thus, the presumption made in the geometric model of the invention about the use of a planar surface in connection with measuring the pseudo range between the satellite 2 and the device 1 will not cause an error in the measurement results which would be significant in view of the accuracy of the positioning.

The device 1 of FIG. 2 further comprises, for example, a display 1.15, a keypad 1.16 and audio means 1.17, 1.18, 1.19, but it will be obvious that in practical applications, the structure of the electronic device 1 may differ from that shown in FIG. 2. Furthermore, the positioning functions include various acquisition and tracking functions which need not be discussed in more detail in this context.

It should also be evident that the present invention is not limited solely to the embodiments presented herein, but it can be modified within the scope of the appended claims.

The invention claimed is:

1. A method for positioning a device, comprising:
performing measurements to determine at least the range between a first positioning station and the device and to determine at least the range between a second positioning station and the device, and in which at least one measurement defines a geometric, quadratic surface for the position of the device, and which first positioning station and second positioning station belong to different systems,
selecting as a geometric model a set of surfaces having common points of intersection such that the position of the device is at least one of the common points of intersection and making the selection on the basis of the measurements, the model comprising, at the most, quadratic surfaces,
simplifying the selected geometric model to reduce the number of quadratic surfaces, to provide a simplified geometric model, but leaving at least one quadratic surface without linearization,
selecting a maximum number of measurements to be used in the simplified geometric model, said maximum number corresponding to the minimum number of measurements required to determine the position,
inserting the measurement results in the simplified geometric model, and
determining the position of the device by solving the simplified geometric model.

2. The method according to claim 1, wherein the first positioning station used is a satellite of a satellite system, wherein the method comprises using at least two pseudo range measurements between two satellites and the device to define a planar surface to represent the position of the device.

3. The method according to claim 1, wherein the first positioning station used is a satellite of a satellite system, wherein the method comprises using at least two pseudo range measurements between two satellites and the device to define the direction of a planar surface representing the position of the device.

4. The method according to claim 1, wherein the second positioning station used is a station of a terrestrial system, wherein the method comprises using a measurement of the range between the second positioning station and the device to define a spherical surface to represent the position of the device.

5. The method according to claim 4, wherein the terrestrial system used is a mobile communication network, wherein the second positioning station is a base station of the mobile communication network.

6. The method according to claim 1, wherein the method comprises using the pseudo range measurements between the positioning station and the device to form measurement pairs, determining a difference between the pseudo ranges for the measurement pairs, and using the difference in the pseudo ranges to define a quadratic surface to represent the position of the device.

7. The method according to claim 1, comprising selecting a set of first positioning stations and a set of second positioning stations, which belong to one and another system, respectively, and performing pseudo range measurements between each positioning station of the first set and the device, and between each positioning station of the second set and the device, respectively.

8. The method according to claim 7, comprising synchronizing the first positioning stations and the second positioning stations with each other, forming each measurement pair of one positioning station of the first set and one positioning station of the second set, and using the same positioning station of the first set in each measurement pair.

9. The method according to claim 6, wherein for forming measurement pairs, the method comprises examining to how many positioning stations of the first set there is a pseudo range measurement available, wherein
if more than one pseudo range measurement of the first positioning station are available, as many measurement pairs as possible are formed of the first positioning stations,
if only one pseudo range measurement of the first positioning station is available, as many measurement pairs as possible are formed of said first positioning station and the second positioning stations, if no pseudo range measurements of the first positioning station are available, as many measurement pairs as possible are formed of the second positioning stations.

10. The method according to claim 1, comprising measuring the altitude of the device in relation to the ground level, and using the altitude measurement to determine a planar surface to represent the position of the device, the surface being substantially parallel to the ground surface.

11. The method according to claim 1, comprising solving the reduced geometric model by finding at least one point of intersection between the surfaces defined by the measurements.

12. The method according to claim 11, wherein if the solution comprises more than one point of intersection, the method comprises using a predetermined criterion to select one point of intersection to define the position of the device.

13. A system for positioning a device, comprising:
a measurement block for taking measurements to determine at least the range between a first positioning station and the device and to determine at least the range between a second positioning station and the device;
control block for defining a geometric, quadratic surface for the position of the device on the basis of at least one measurement, said first positioning station and second positioning station belonging to different systems,
for selecting a geometric model comprising, at the most, quadratic surfaces on the basis of the measurements,
for simplifying the selected geometric model to reduce the number of quadratic surfaces, but leaving at least one quadratic surface without linearization,
for selecting a maximum number of measurements to be used in the simplified geometric model, said maximum number corresponding to the minimum number of measurements required to determine the position,
for inserting the measurement results in the simplified geometric model, and
for solving the simplified geometric model to define the position of the device.

14. The system according to claim 13, wherein the first positioning station is a satellite of a satellite system, wherein the system is adapted to use at least two pseudo range measurements between two satellites and the device to define a planar surface to represent the position of the device.

15. The system according to claim 13, wherein the first positioning station is a satellite of a satellite system, wherein the system is adapted to use a pseudo range measurement between two satellites and the device to define the direction of the planar surface representing the position of the device.

16. The system according to claim 13, wherein the system is adapted to use the second positioning station is a station of a terrestrial system, wherein a measurement of the range between the second positioning station and the device to define a spherical surface to represent the position of the device.

17. The system according to claim 16, wherein the terrestrial system comprises a mobile communication network, wherein the second positioning station is a base station of the mobile communication network.

18. The system according to claim 13, wherein said control block is also for forming measurement pairs of pseudo range measurements between the positioning station and the device and for determining the difference between the pseudo ranges, wherein the system is adapted to use the difference in the pseudo ranges to define a quadratic surface to represent the position of the device.

19. The system according to claim 13, wherein said control block is also for selecting a set of first positioning stations and a set of second positioning stations, which belong to one system and another system, respectively, and for taking pseudo range measurements between each positioning station of the first set and the device, and between each position station of the second set and the device, respectively.

20. The system according to claim 19, wherein the first positioning stations and the second positioning stations are in synchronization with each other, wherein each measurement pair consists of one positioning station of the first set and one positioning station of the second set, and that the same positioning station of the first set is used in each measurement pair.

21. The system according to claim 13, wherein said control block is also for measuring the altitude of the device in relation to the ground level, wherein the system is adapted to use the altitude measurement to define a planar surface to represent the position of the device, the surface being substantially parallel to the ground surface.

22. A device comprising:
a measuring block for taking measurements to determine at least the range between a first positioning station and the device and to determine at least the range between a second positioning station and the device;
a control block for defining a geometric, quadratic surface for the position of the device on the basis of at least one measurement, said first positioning station and second positioning station belonging to different systems,
for selecting, on the basis of the measurements, a geometric model comprising, at the most, quadratic surfaces,
for simplifying the selected geometric model to reduce the number of quadratic surfaces, but leaving at least one quadratic surface without linearization,
for selecting a maximum number of measurements to be used in the simplified geometric model, said maximum number corresponding to the minimum number of measurements required to determine the position,
for inserting the measurement results in the simplified geometric model, and
for solving the simplified geometric model to define the position of the device.

23. The device according to claim 22, wherein said control block is also for forming measurement pairs of pseudo range measurements between the positioning station and the device and for determining the difference between the pseudo ranges, wherein the device is adapted to use the difference in the pseudo ranges to define a quadratic surface to represent the position of the device.

24. The device according to claim 22, wherein said control block is also for selecting a set of first positioning stations and a set of second positioning stations, which belong to one system and another system, respectively, and means for taking pseudo range measurements between each positioning station of the first set and the device, and between each position station of the second set and the device, respectively.

25. The device according to claim 24, wherein the first positioning stations and the second positioning stations are in synchronization with each other, wherein each measurement pair consists of one positioning station of the first set and one positioning station of the second set, and that the same positioning station of the first set is used in each measurement pair.

26. The device according to claim 22, wherein said measuring block is also for measuring the altitude of the device in relation to the ground level, wherein the device is adapted to use the altitude measurement to define a planar surface to represent the position of the device, the surface being substantially parallel to the ground surface.

27. A mobile communication device comprising:
a measurement block for taking measurements to determine at least the range between a first positioning station and the device and to determine at least the range between a second positioning station and the device;
a control block for defining a geometric, quadratic surface for the position of the device on the basis of at least one measurement, said first positioning station and second positioning station belonging to different systems,
for selecting, on the basis of the measurements, a geometric model comprising, at the most, quadratic surfaces,
for simplifying the selected geometric model to reduce the number of quadratic surfaces, but leaving at least one quadratic surface without linearization,
for selecting a maximum number of measurements to be used in the simplified geometric model, said maximum number corresponding to the minimum number of measurements required to determine the position,
for inserting the measurement results in the simplified geometric model, and
for solving the simplified geometric model to define the position of the device.

28. A program embodied in a computer readable medium, said program comprising executable program commands for positioning a device, which program comprises program commands for taking measurements to determine at least the range between a first positioning station and the device and to determine at least the range between a second positioning station and the device, and wherein at least one measurement defines a geometric, quadratic surface for the position of the device, and said first positioning station and second positioning station belonging to different systems, wherein the program also comprises program commands for
selecting, on the basis of measurements, a geometric model which comprises, at the most, quadratic surfaces,
simplifying the selected geometric model to reduce the number of quadratic surfaces, but leaving at least one quadratic surface without linearization,
selecting a maximum number of measurements to be used in the simplified geometric model, said maximum number corresponding to the minimum number of measurements required to determine the position,
inserting the measurement results in the simplified geometric model, and
determining the position of the device by solving the simplified geometric model.

29. A storage medium for storing a program which comprises machine executable program commands for positioning a device, which program comprises program commands for taking measurements to determine at least the range between a first positioning station and the device and to determine at least the range between a second positioning station and the device, and wherein at least one measurement defines a geometric, quadratic surface for the position of the device, and said first positioning station and second positioning station belonging to different systems, wherein the program stored on the storage medium also comprises program commands for
selecting, on the basis of measurements, a geometric model which comprises, at the most, quadratic surfaces,
simplifying the selected geometric model to reduce the number of quadratic surfaces, but leaving at least one quadratic surface without linearization,
selecting a maximum number of measurements to be used in the simplified geometric model, said maximum number corresponding to the minimum number of measurements required to determine the position,
inserting the measurement results in the simplified geometric model, and
determining the position of the device by solving the simplified geometric model.

30. The method according to claim 1 comprising using a spherical surface as said quadratic surface, and leaving the spherical surface without linearization.

31. The system according to claim 13, said control block configured to use a spherical surface as said quadratic surface, and to leave the spherical surface without linearization.

32. The device according to claim 22, said control block configured to use a spherical surface as said quadratic surface, and to leave the spherical surface without linearization.

33. The mobile communication device according to claim 27, said control block configured to use a spherical surface as said quadratic surface, and to leave the spherical surface without linearization.

34. The program according to claim 28, said program comprising executable program commands for using a spherical surface as said quadratic surface, and for leaving the spherical surface without linearization.

35. The storage medium according to claim 28, said program comprising executable program commands for using a spherical surface as said quadratic surface, and for leaving the spherical surface without linearization.

* * * * *